(12) United States Patent
Davis

(10) Patent No.: US 8,893,443 B2
(45) Date of Patent: Nov. 25, 2014

(54) SUPPORT STRUCTURE WITH STOWED IMPLEMENT BRACKET

(75) Inventor: Adam Davis, Leola, PA (US)

(73) Assignee: Tait Towers Manufacturing, LLC, Lititz, PA (US)

( * ) Notice: Subject to any disclaimer, the term of this patent is extended or adjusted under 35 U.S.C. 154(b) by 143 days.

(21) Appl. No.: 13/367,482

(22) Filed: Feb. 7, 2012

(65) Prior Publication Data

US 2013/0200022 A1    Aug. 8, 2013

(51) Int. Cl.
*E04B 1/34*        (2006.01)
*E04H 1/12*        (2006.01)

(52) U.S. Cl.
USPC ........... 52/143; 52/650.3; 52/648.1; 182/150; 280/30; 280/35; 280/79.11; 280/47.35; 280/79.4; 248/128; 248/911; 362/220; 362/249.01

(58) Field of Classification Search
USPC ............. 211/85.8, 85.6, 13.1, 26, 175, 86.01, 211/87.01, 90.02, 96, 97, 100, 104, 105.3; 361/727, 734; 280/79.2, 79.3, 35, 651, 280/79.7, 30, 47.35, 79.4, 79.11; 248/130, 248/139, 141, 142, 128, 133, 122.1, 129, 248/911; 362/220, 249.01, 368, 430; 52/143, 650.3, 648.1; 182/150
See application file for complete search history.

(56) References Cited

U.S. PATENT DOCUMENTS

| | | | | |
|---|---|---|---|---|
| 2,070,334 A * | 2/1937 | Garber | ......................... | 362/253 |
| 2,937,768 A * | 5/1960 | Davis | ........................... | 211/175 |
| 4,660,791 A * | 4/1987 | Lisak | ........................ | 248/122.1 |
| 5,432,691 A * | 7/1995 | Garrett et al. | ................. | 362/233 |
| 5,551,199 A * | 9/1996 | Hayes et al. | ................. | 52/648.1 |
| 5,743,060 A * | 4/1998 | Hayes et al. | ................. | 52/648.1 |
| 5,791,498 A * | 8/1998 | Mills | .............................. | 211/26 |
| 5,876,050 A * | 3/1999 | Berger | ........................ | 280/79.2 |
| 5,993,830 A * | 11/1999 | Freij | ............................. | 424/400 |
| 6,021,047 A * | 2/2000 | Lopez et al. | .................. | 361/727 |
| 6,026,626 A * | 2/2000 | Fisher | ............................ | 52/633 |
| 6,471,078 B2 * | 10/2002 | Pyle | ............................. | 211/85.6 |
| 6,663,139 B1 * | 12/2003 | Smith | ........................... | 280/651 |
| 7,293,784 B2 * | 11/2007 | Liu | ................................ | 280/35 |
| 8,099,913 B1 * | 1/2012 | Dodd | ............................ | 52/143 |
| 8,517,397 B2 * | 8/2013 | Gross | ............................ | 280/35 |
| 8,528,919 B2 * | 9/2013 | Webster et al. | ............. | 280/79.7 |
| 8,757,641 B2 * | 6/2014 | Gross | ............................ | 280/35 |
| 2008/0150244 A1 * | 6/2008 | Carlei | ........................... | 280/35 |
| 2009/0166999 A1 * | 7/2009 | Mason et al. | ................. | 280/651 |

* cited by examiner

*Primary Examiner* — Chi Q Nguyen

(57) ABSTRACT

A support structure of the type used as a truss for entertainment productions is disclosed. The support structure includes a plurality of frame segments arranged to form a truss and an implement bracket attached to the truss, the implement bracket connecting an implement to the truss. The implement bracket deploys from a stowed position within a space defined by the truss through a window of the truss formed by truss frame segments to a working position outside the space defined by the truss.

16 Claims, 6 Drawing Sheets

US 8,893,443 B2

SUPPORT STRUCTURE WITH STOWED IMPLEMENT BRACKET

FIELD

This application is directed to equipment used to stage entertainment productions and more particularly to support structures used in staging such productions.

BACKGROUND

Productions featuring famous bands or other music stars, as well as musicals, plays, and other forms of entertainment are often touring productions. These productions typically appear at a particular venue in a particular city for a limited time, often just a single show on a single night. Despite the limited nature of the engagements, the staging of such productions is usually complex and highly customized. As a result, shows generally travel with their own caravan of stage equipment that is assembled and disassembled at each stop along the tour.

Assembling and disassembling the stage is a time consuming chore that generally entails many persons, often referred to as road-hands or "roadies," working many long hours. Furthermore, the tour schedule usually leaves little time to spare between performances and the stage assembly/disassembly can be a race against the clock. Touring productions are usually very expensive to produce and additional costs can have an adverse effect on a production's overall profitability.

Accordingly, it would be desirable to leave certain portions of stage equipment already assembled to save time between shows. However, doing so is impractical with current stage designs because of space constraints. Leaving pieces pre-assembled could save time, but means pieces would not stack as well. This, in turn, would require more trucks to transport the equipment and can result in unacceptably high transportation costs.

Alternatively, disassembling stage equipment to the point that it stacks efficiently requires sufficient personnel to ensure that schedules are still maintained, resulting in increased labor costs. It also increases the opportunity for mistakes and the possibility that something will be misplaced and/or re-assembled incorrectly.

What is needed is a structure for staged productions that overcomes these and other drawbacks in current staging equipment.

SUMMARY

Exemplary embodiments are directed to support structures for staged productions that allow implements such as lights, winches, and other commonly used stage equipment to be stored within the support structure so that they remain assembled to the support structure but without taking up extra space that impedes stackability.

In one embodiment, a support structure comprises a plurality of frame segments arranged to form a truss and an implement bracket attached to the truss. The implement bracket connects an implement to the truss, the implement bracket configured to deploy from a stowed position within a space defined by the truss through a window of the truss formed by truss frame segments to a working position outside the space defined by the truss.

In some embodiments, the plurality of frame segments are arranged to form a truss, the truss having a truss floor providing a pedestrian walkway. In some embodiments, the implement bracket is attached to the truss and configured to deploy from a stowed position within a space defined by the truss through a window of the truss formed by truss frame segments to a working position outside the space defined by the truss in which the implement bracket comprises a lower bracket portion and an upper bracket portion.

In some embodiments, the lower bracket portion comprises a plurality of lower bracket arms connected by at least one lower bracket cross-brace having an implement attached thereto and in one embodiment, the lower bracket arms include a right angle brace that engages at least one frame segment when the implement bracket is in the working position. In some embodiments, the upper bracket portion comprises a plurality of upper bracket arms connected by a stop bar, the stop bar sized to engage at least two frame segments when the implement bracket is in the working position. In one embodiment, the upper bracket portion is further connected by an upper bracket cross-arm and the lower and upper bracket portions are connected by a strap in which the strap is held in tension when the bracket is outside the truss space.

An advantage of certain embodiments is that implements used in staged productions can be left attached to the support structure to reduce the burden of assembly and disassembly but without expanding the storage footprint when the structure is packed for transport.

Another advantage of certain embodiments is that lamps and other implements attached to the truss can be easily retracted from a working position for easier accessibility in performing maintenance.

Yet another advantage of certain embodiments is that the implement bracket provides safety features when the bracket is deployed to its working position.

Other features and advantages of the present invention will be apparent from the following more detailed description of exemplary embodiments, taken in conjunction with the accompanying drawings which illustrate, by way of example, the principles of the invention.

DETAILED DESCRIPTION OF EXEMPLARY EMBODIMENTS

Exemplary embodiments are directed to support structures for staged productions that allow implements such as lights, winches, and other commonly used stage equipment to be stored within the support structure. As a result, the implements take up little or no space outside the support structure when retracted. This aids in storage and transport. The implements can still be deployed quickly and easily for use during a production.

Figure 1:
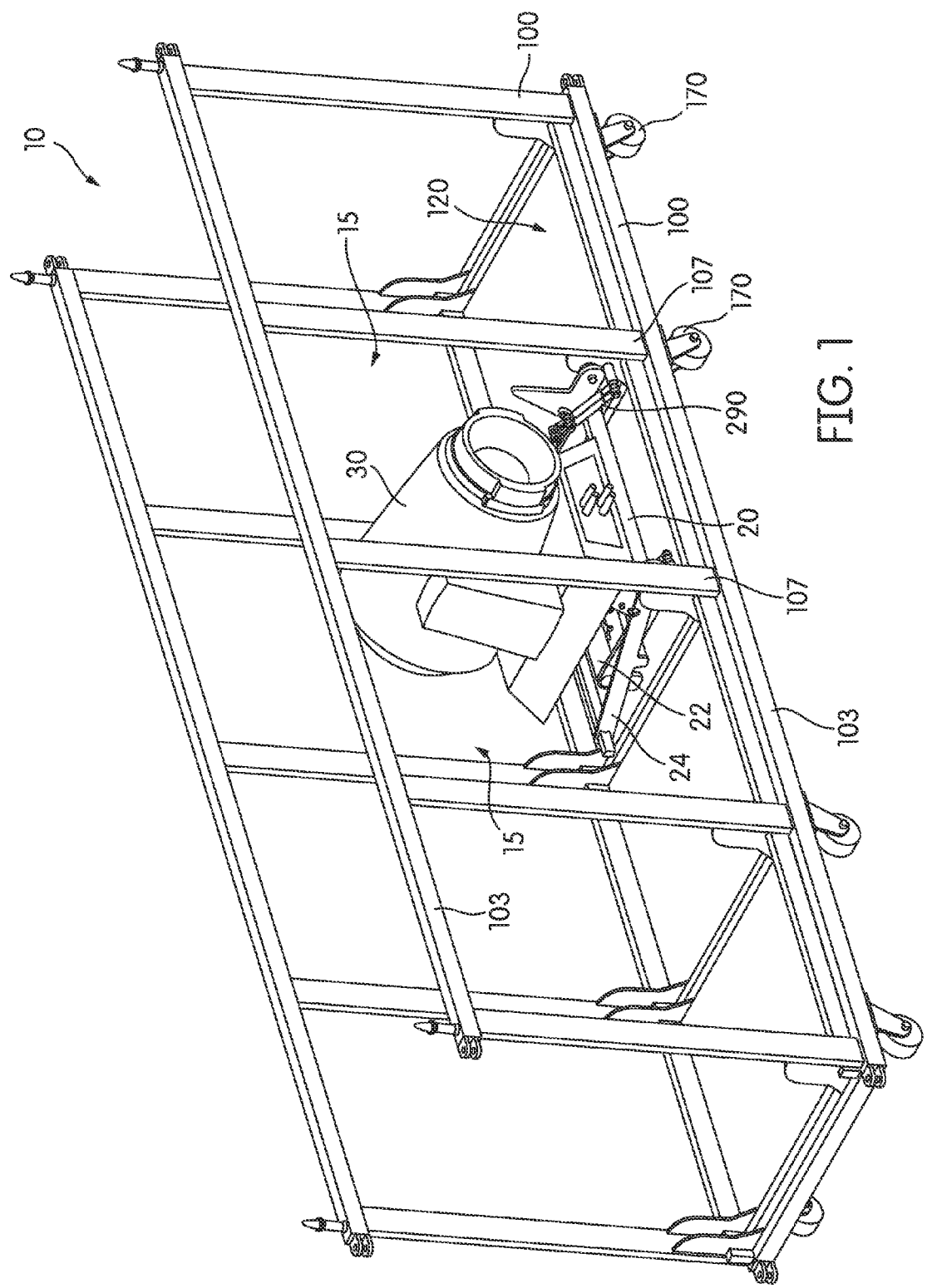
FIG. 1 illustrates a perspective view of a support structure in accordance with an exemplary embodiment with the bracket in the stowed position.
Figure 2:
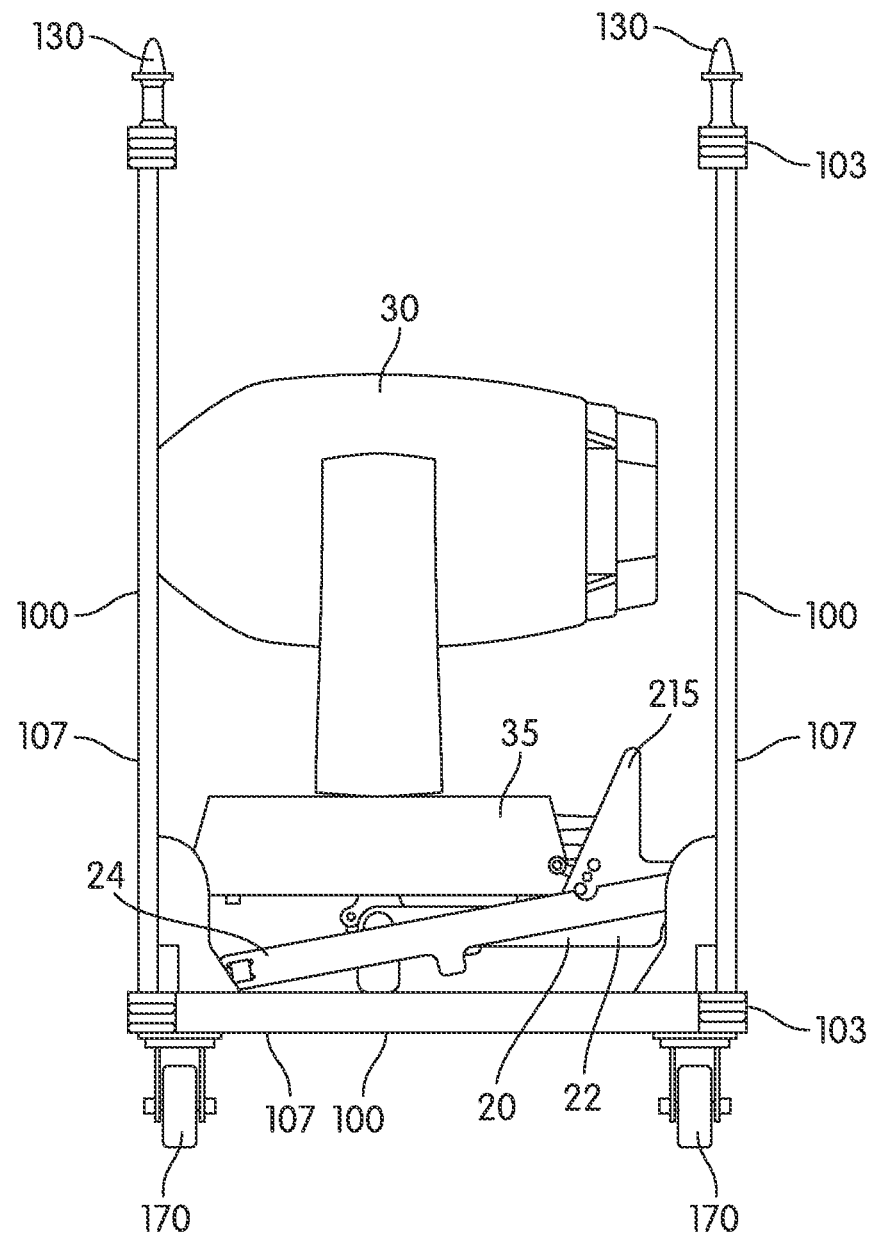
FIG. 2 illustrates a side view of the support structure of FIG. 1.

Turning to FIGS. 1 and 2, a support structure in accordance with an exemplary embodiment is illustrated including a truss 10. The truss 10 is formed from a plurality of frame segments 100, which may be formed in a conventional manner. It will be appreciated that the term truss is used in its broadest sense to refer to an assemblage of members forming a rigid framework and does not necessarily imply the use of triangular supports.

Typically, the truss 10 includes frame segments that are elongate beams 103 that define the top and bottom of the truss 10, connected by other frame segments, such as braces 107, that connect the elongate beams 103 from top to bottom, across the bottom elongate beams 103, and optionally across the top elongate beams 103. Braces 107 may be used to connect the beams 103 in a substantially vertical or horizontal fashion as shown in FIGS. 1 and 2; additional braces 107 may also optionally be incorporated to connect diagonally to provide additional structural support. The number, spacing and arrangement of braces 107 may vary based on numerous design factors including the amount of weight the truss 10 is expected to support.

The design and construction of a frame structure used to form trusses, including those used as staging equipment, is generally well known and understood by those in the art and the arrangement of frame segments described herein is merely exemplary.

In embodiments in which the truss 10 is provided as a catwalk, including the illustrated embodiments, the bottom of the truss 10 includes a platform 120 to provide a pathway for pedestrian access. The platform 120 may be placed over braces 107 connecting the bottom beams 103 or the platform 120 may itself be provided as one or more frame segments that connect the bottom beams 103. In some embodiments, the platform 120 may be removable from the truss 10 to provide access to the stage below.

It will be appreciated that directional terms such as top, bottom and sides are used for purposes of explanation with respect to the embodiment shown in FIGS. 1-4, in which the truss is a provided as a catwalk truss that provides pedestrian access. It is understood that such terms are relative to orientation and that other style trusses may be used in accordance with exemplary embodiments and/or arranged in different orientations. It will further be appreciated that while the truss is illustrated as having an open rectangular cross-section (see FIGS. 2 and 4), the frame segments may be arranged to form a truss having cross-sections of other geometric configurations. For example, in embodiments in which pedestrian access is not intended, it may be desirable to provide a truss having a triangular cross-section.

The exemplary embodiments discussed herein are particularly advantageous as a portable truss for use in touring productions. The truss 10 may include rollers 170 extending from the bottom that aid in moving the truss 10 to a particular location within the venue. It will further be appreciated that stage assembly may include multiple trusses 10 that are joined to one another for use in the production to form a single, longer truss that is longer than could otherwise be transported. In either case, the length and position of the truss 10 may be determined by the overall stage design.

Typically, the truss 10 is raised to a location above the performance stage by connecting it to a chain drive (not shown) positioned in rafters above the stage.

In accordance with exemplary embodiments, the truss 10 also includes an implement bracket 20 that attaches to an implement 30. The bracket 20 allows the implement 30 to be readily and easily deployed between a stowed position (FIGS. 1 and 2) for storage and/or maintenance and a working position (FIGS. 3 and 4) for the implement's use in the production in its intended manner. In the illustrated embodiments, the bracket 20 is configured to rotate out of the truss 10 through a window 15 defined by the frame segments 100. The bracket rotates about an axis defined by the points of attachment of the bracket 20 to the truss 10, which act as pivot points. It will be appreciated, however, that other manners of deploying the bracket 20 are possible and contemplated within the scope of the invention, including, for example, sliding the bracket 20 from the truss 10 to transition between the stowed and working positions.

Figure 6:
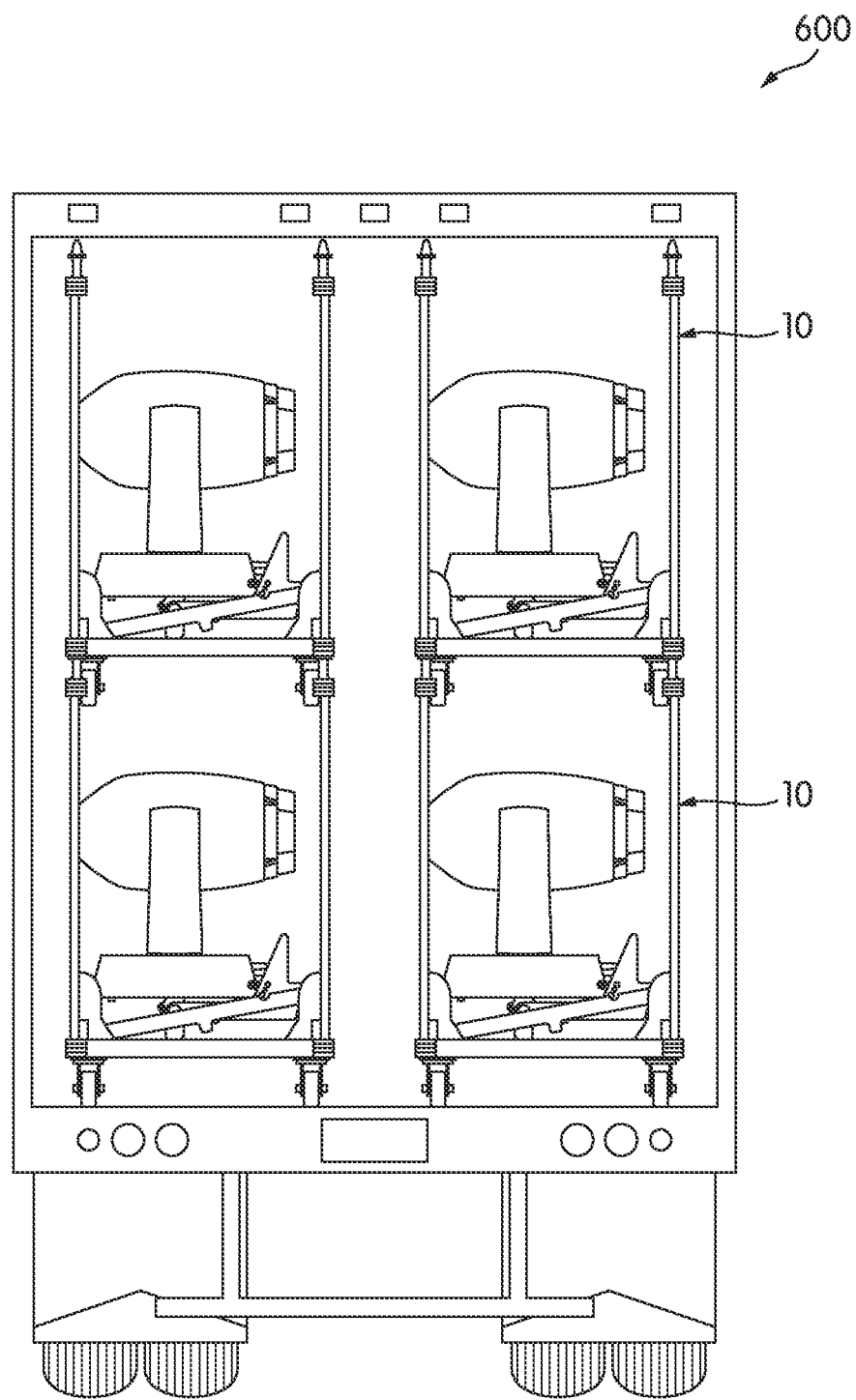
FIG. 6 illustrates a plurality of support structures of FIG. 1 stacked in a hauler for transport.

In the stowed position, the bracket 20 permits the implement 30 to be confined within an interior space defined by the truss 10. As a result, the implement 30 can be left attached to the truss 10 when the truss 10 is packed for transport between venues. The implement 30 takes up little, if any additional room not already required for the truss, allowing for efficient space utilization and maximizing available hauler space, as illustrated with respect to the hauler 600 in FIG. 6. As also illustrated in FIGS. 2 and 6, the truss 10 may include posts 130 extending from the top beam 103 so that multiple trusses 10 can be stacked directly on top of one another, with each post 130 being received in a corresponding channel formed in the underside of the bottom beam 103 of the second truss 10 situated over the first.

The truss 10 can also be moved from one location to another within a particular venue without further disassembly of the implement(s) 30 from the truss 10. Furthermore, after the truss 10 is in place and/or when used in more permanent installations, the bracket 20 also allows the implement 30 to be conveniently retracted from the working position for easier accessibility for maintenance or other adjustments to the equipment.

Although the implement 30 is hereinafter shown and described with respect to a lamp, it will be appreciated that any implement that might be used in a stage production or other environment in which exemplary embodiments might be employed can be attached to the bracket 20. Examples of other such implements include, by way of example only, a winch, a speaker or other audio device, props, etc. In one embodiment, the bracket 20 is used in conjunction with a lamp 30 that is a self dampening lamp that includes an oscillation damper 35. The damper counteracts forces caused by relative movement of the lamp with respect to the truss during operation in order to provide a more stable and consistent quality of light projection.

Figure 3:
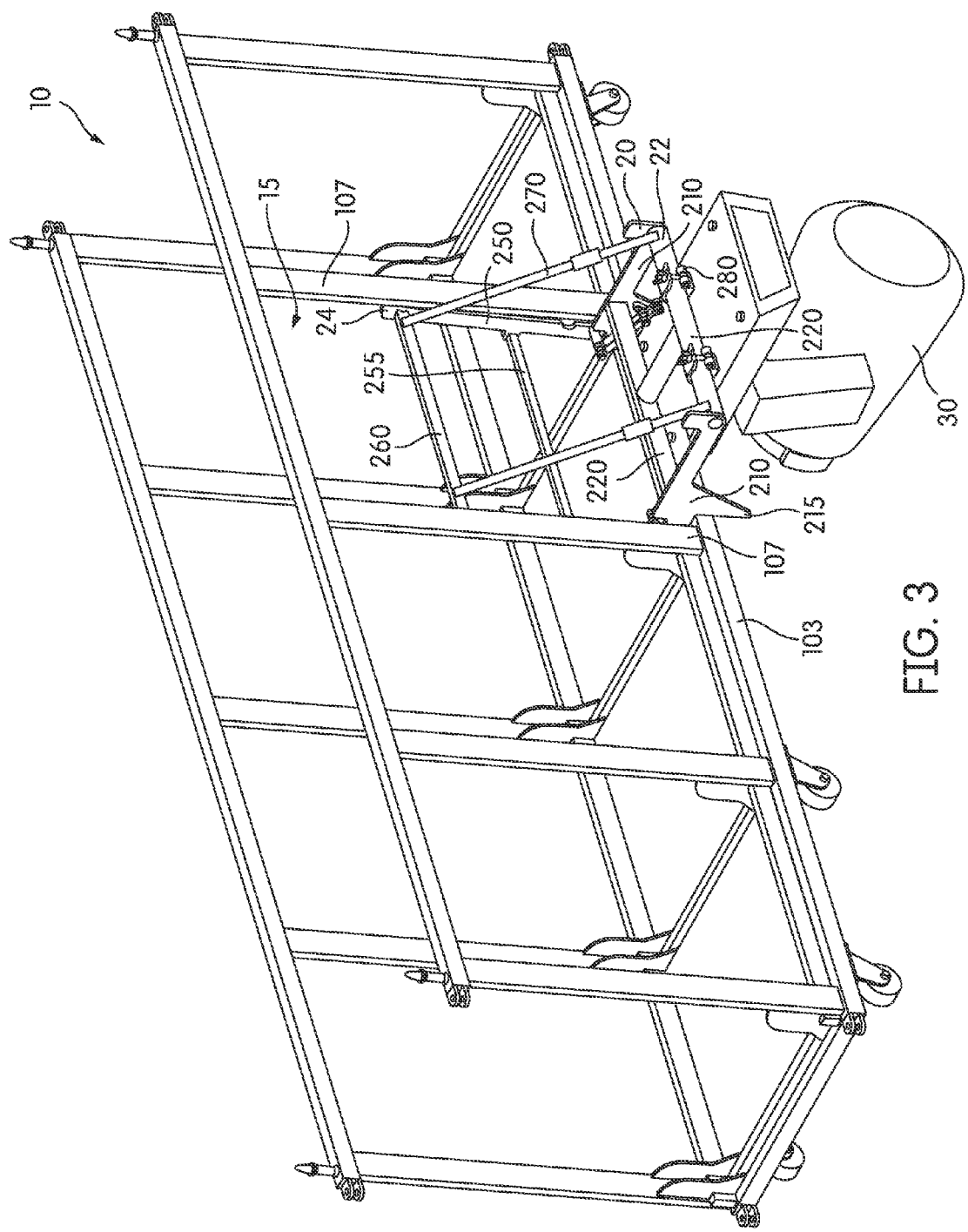
FIG. 3 illustrates the support structure of FIG. 1 with the bracket in the working position.
Figure 4:
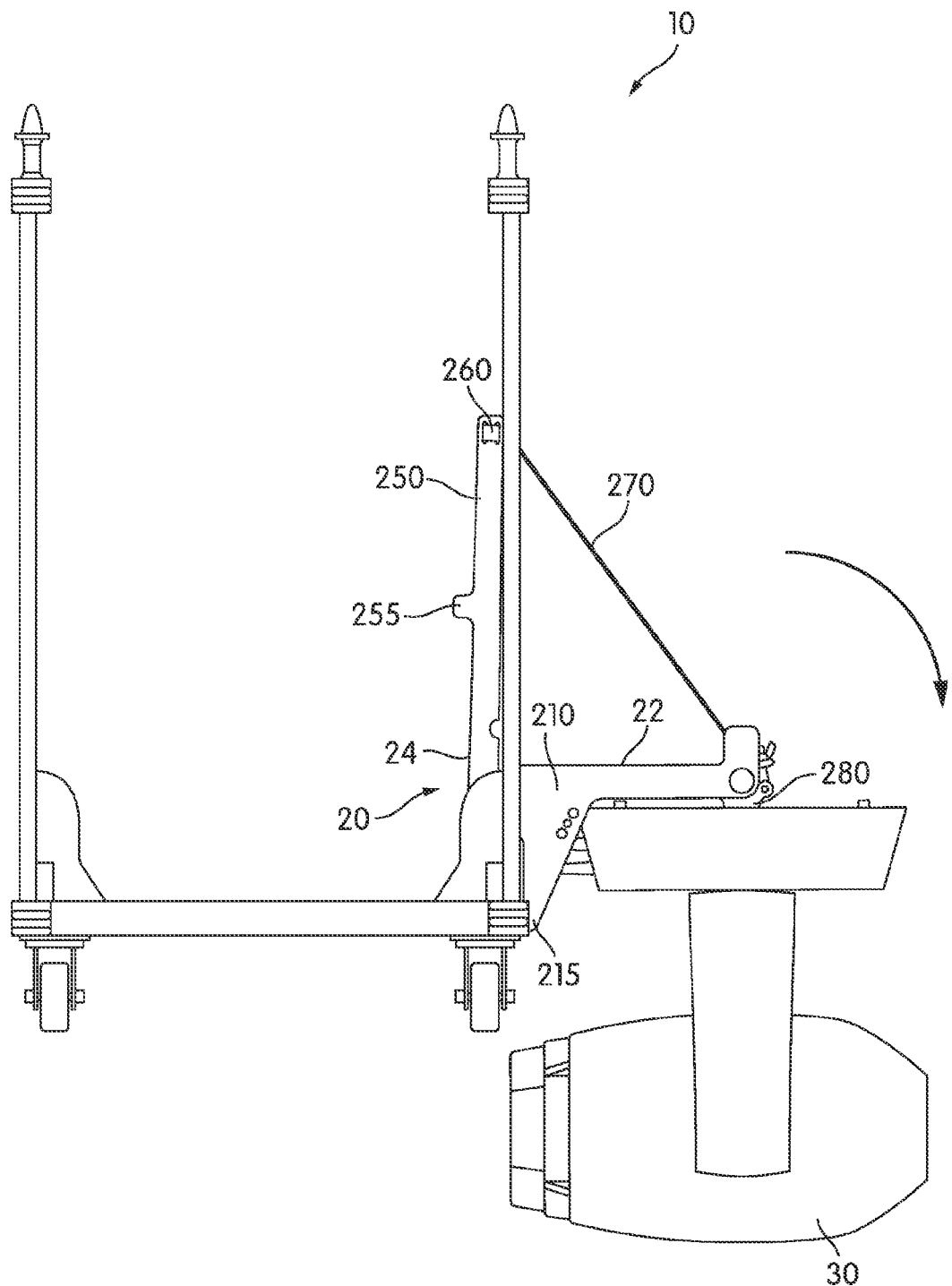
FIG. 4 illustrates a side view of FIG. 3.

FIGS. 1 and 2 illustrate the bracket 20 including a lower bracket portion 22 and an upper bracket portion 24, which may be disposed substantially adjacent one another in the stowed position prior to deployment. Turning to FIGS. 3 and 4, the bracket 20 is illustrated after it (and its corresponding implement 30) has been deployed to the working position.

As illustrated, the lower bracket portion 22 includes two lower bracket arms 210 each having an angle brace 215 extending therefrom. The angle braces 215 engage the bottom truss beams 103 to establish the working position of the implement. The angle braces 215 are shown as right angle braces and the lower bracket portion 22 and the implement 30 rotate approximately 180 degrees in moving between the stowed and working positions. The bracket arms 210 may be joined by one or more bracket cross-braces 220 to add structural support to the bracket 20. The bracket cross-brace 220 may have one or more clamps 280 that can be used to secure the implement 30 to the bracket 20. In some embodiments, it may be desirable to form the lower bracket arms 210 in a manner such that implement 30 remains level when the bracket 20 is in the stowed position as shown in FIGS. 1 and 2.

As best seen in FIG. 3, the upper bracket portion 24 includes two upper bracket arms 250 connected by a stop bar 260. The upper bracket portion 24 rotates such that the upper bracket arms 250 go from a generally horizontal arrangement in the stowed position (FIGS. 1 and 2) to a generally vertical arrangement in the working position (FIGS. 3 and 4). The stop bar 260 connects the two upper bracket arms 250; preferably it is sized to be longer than the space between the two braces 107 that define the sides of the window 15 in the truss 10 from which the lamp or other implement 30 is deployed such that the stop bar 160 engages at least one and typically two truss braces 107 forming part of the window 15. Like the angle braces 215 of the lower bracket portion 22, the stop bar 260 prevents further rotation of the bracket 20 outside of the truss 10 to define the working position. When the implement is outside the truss 10 in its working position, the truss's center of gravity changes. Because the stop bar 260 can engage at least one of the truss braces 107, it can also act to distribute the load force exerted by the implement 30 in that position throughout the rest of the truss 10.

To further support the weight of the implement 30, the bracket 20 may include one or more straps 270 that connect the upper and lower bracket portions 22, 24. The straps 270 are in tension when the bracket 20 has been deployed to the working position. The use of straps to connect the upper and lower bracket portions 22, 24 is advantageous because the straps 270 are in tension when the bracket 20 has been deployed to the working position but they become limp in the stowed position and can thus allow for more convenient access to the implement 30.

The upper bracket arms 250 may also be connected by one or more additional cross-arms 255 in addition to the stop bar 260. These arms 255 and/or the stop bar 260 can provide additional safety to personnel walking along and/or working in the truss 10 (particularly when the truss is raised above the ground) by introducing horizontal barriers that reduce the likelihood of falling. The cross-arms 255 also provide an additional hand rail for personnel to support themselves as they walk along the truss 10 and can also be used as a handle to pull on the lamp or other implement 30 when it is to be returned to its stowed position.

Although the bracket 20 may be attached directly to the truss 10 via the lower bracket and/or upper bracket portions 22, 24, in some embodiments the bracket 20 may also include one or more bracket deployment mechanisms 290 (FIG. 1) to attach the bracket 20 to the truss 10. The deployment mechanism 290 may be an actuating device that includes a spring, a hydraulic lever, a pneumatic lever, or some other device that can provide mechanical assistance to a user in deploying or retracting the bracket 20 from the truss 10. Such assistance may be particularly desirable where the lamp or other implement 30 is heavy.

Figure 5:
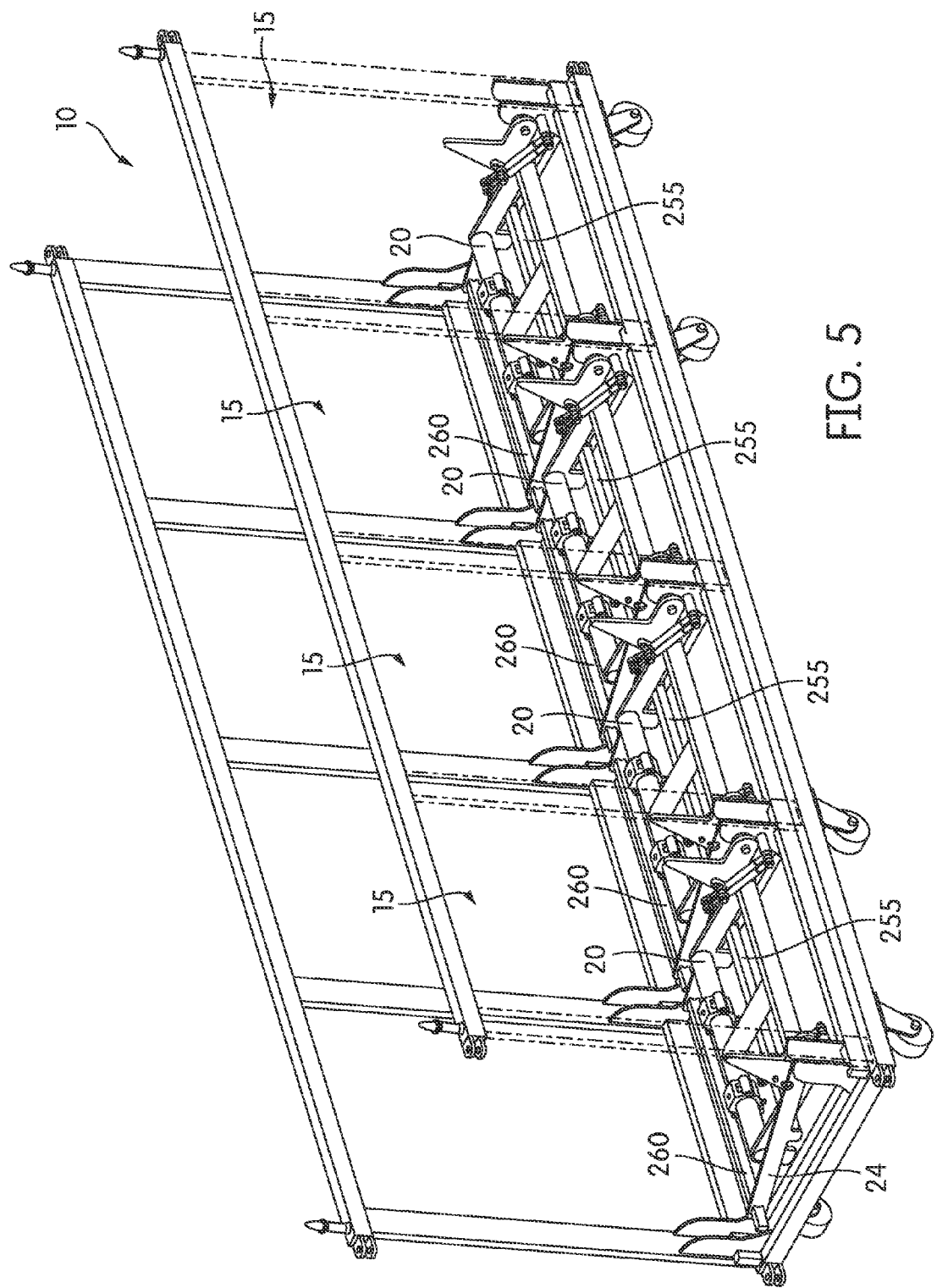
FIG. 5 illustrates a perspective view of the support structure of FIG. 1 without an attached implement.

It will be appreciated that while the truss 10 shown in FIGS. 1-4 illustrates only a single implement bracket 20 and corresponding implement 30, multiple brackets 20 can be placed within a single truss 10, with lamps or other devices positioned at each of appropriately sized windows 15 as shown in FIG. 5, which also illustrates the brackets 20 without an implement attached and with the front braces shown in broken line for purposes of illustration. In situations in which multiple implement brackets 20 are arranged side by side, the stop bar 260 and/or other cross-arms 255 of the upper bracket portion 24 may form a continuous or semi-continuous handrail along the entire length of the truss 10 when the brackets 20 are in their working positions.

While exemplary embodiments have been discussed herein primarily with respect to portable, catwalk style trusses, it will be appreciated that the invention is not so limited. One or more aspects of the invention may be incorporated into more permanent trusses used in dedicated performance venues and/ or may be used in conjunction with trusses that do not provide pedestrian access in addition to serving as a support structure for various production implements.

While the foregoing specification illustrates and describes exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A support structure comprising:
a plurality of frame segments arranged to form a truss; and
an implement bracket attached to the truss, the implement bracket connecting an implement to the truss, the implement bracket configured to deploy from a stowed position within a space defined by the truss through a window of the truss formed by truss frame segments to a working position outside the space defined by the truss;
wherein the implement bracket rotates outside the truss space when the implement bracket is in the working position.

2. The support structure of claim 1, wherein the truss comprises a platform forming a truss floor.

3. The support structure of claim 1, wherein the working implement includes a lamp.

4. The support structure of claim 3, wherein the lamp is a self-dampening lamp.

5. The support structure of claim 1, wherein the support structure further comprises a plurality of rollers extending from the truss.

6. The support structure of claim 1, wherein the implement bracket forms a truss handrail when deployed in the working configuration.

7. The support structure of claim 1, wherein the implement includes a stop bar that engages at least one of the frame segments.

8. The support structure of claim 1, wherein the implement bracket is held in the working position by an angle brace extending from the implement bracket that engages at least one of the frame segments.

9. The support structure of claim 1, wherein the implement bracket includes a handle for deploying the working implement between the working and stowed positions.

10. The support structure of claim 1, wherein the truss provides a pedestrian walkway.

11. The support structure of claim 1, wherein the bracket comprises a bracket deployment mechanism attached to the truss.

12. The support structure of claim 1, wherein the truss comprises a plurality of platform segments forming a truss floor, at least one platform segment being removable from the truss.

13. A support structure comprising:
a plurality of frame segments arranged to form a truss; and
an implement bracket attached to the truss, the implement bracket being connectable to an implement, the implement bracket configured to deploy from a stowed position within a space defined by the truss through a window of the truss formed by truss frame segments to a working position outside the space defined by the truss;

the bracket comprises an upper bracket portion and a lower bracket portion, the lower bracket portion having a plurality of lower bracket arms connected by a lower bracket cross-brace and the upper bracket portion having a plurality of upper bracket arms connected by a stop bar, the stop bar sized to engage at least two frame segments when the implement bracket is in the working position.

14. The support structure of claim 13, wherein the upper bracket portion and the lower bracket portion are connected by a strap.

15. The support structure of claim 13, wherein the upper bracket portion further includes an upper bracket cross-arm extending between the upper bracket arms.

16. A portable truss comprising:
a plurality of frame segments arranged to form a truss, the truss having a truss floor providing a pedestrian walkway; and
an implement bracket attached to the truss and configured to deploy from a stowed position within a space defined by the truss through a window of the truss formed by truss frame segments to a working position outside the space defined by the truss, the implement bracket comprising a lower bracket portion and an upper bracket portion,
the lower bracket portion comprising a plurality of lower bracket arms connected by at least one lower bracket cross-brace, the at least one lower bracket cross-brace being attachable to an implement, the lower bracket arms including a right angle brace that engages at least one frame segment when the implement bracket is in the working position and the upper bracket portion comprising a plurality of upper bracket arms connected by a stop bar, the stop bar sized to engage at least two frame segments when the implement bracket is in the working position and further connected by an upper bracket cross-arm, the lower and upper bracket portion connected by a strap, the strap held in tension when the bracket is outside the truss space.

* * * * *